(12) United States Patent
Hoffman et al.

(10) Patent No.: US 7,503,461 B1
(45) Date of Patent: Mar. 17, 2009

(54) AIR-ADMITTANCE DEVICE AND METHOD FOR MAKING SAME

(75) Inventors: Wesley P. Hoffman, Palmdale, CA (US); Phillip G. Wapner, Palmdale, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 682 days.

(21) Appl. No.: 10/874,006

(22) Filed: Jun. 16, 2004

Related U.S. Application Data

(63) Continuation-in-part of application No. 10/144,571, filed on May 13, 2002, now Pat. No. 6,818,162.

(51) Int. Cl.
*A61J 9/04* (2006.01)
*A61J 11/02* (2006.01)

(52) U.S. Cl. .............. 215/11.5; 215/902; 220/745; 220/913

(58) Field of Classification Search ........... 215/11.5, 215/903, 261, 902; 220/745, 913, 203.11, 220/203.29; 206/550
See application file for complete search history.

(56) References Cited

U.S. PATENT DOCUMENTS

| | | | | |
|---|---|---|---|---|
| 2,321,236 A | * | 6/1943 | Parkin | 137/860 |
| 2,770,235 A | * | 11/1956 | Nesset et al. | 215/308 |
| 4,719,013 A | * | 1/1988 | Brockmeyer | 210/510.1 |
| 4,865,207 A | | 9/1989 | Joyner et al. | |
| 5,236,595 A | * | 8/1993 | Wang et al. | 210/669 |
| 5,339,971 A | * | 8/1994 | Rohrig | 215/11.5 |
| 5,352,512 A | * | 10/1994 | Hoffman | 428/311.51 |
| 5,539,971 A | | 7/1996 | Kelly | |
| 5,766,660 A | * | 6/1998 | Lee et al. | 426/118 |
| 6,113,722 A | * | 9/2000 | Hoffman et al. | 156/155 |
| 6,398,048 B1 | | 6/2002 | Kevorkian | |
| 6,619,499 B1 | * | 9/2003 | Lin | 220/371 |
| 2003/0040700 A1 | * | 2/2003 | Hickle et al. | 604/67 |

FOREIGN PATENT DOCUMENTS

GB 2250017 A * 5/1992
GB 2271348 A * 4/1994

* cited by examiner

*Primary Examiner*—Sue A Weaver
(74) *Attorney, Agent, or Firm*—AFMCLO/JAZ; Bart S. Hersko

(57) ABSTRACT

There are provided methods for fabricating devices for admitting air to a closed container while preventing passage of a water-based fluid therethrough. These devices comprise a plurality of hydrophobic capillaries or a hydrophobic reticulated microporous material. The devices comprising hydrophobic capillaries are fabricated by a variety of techniques, such as those employing extrusion, pultrusion, fugitive mandrel removal or a combination of these techniques. The devices comprising hydrophobic reticulated microporous material are fabricated by techniques such as foaming, sintering, template replication, incorporation of sacrificial particles or a combination of these techniques.

4 Claims, 10 Drawing Sheets

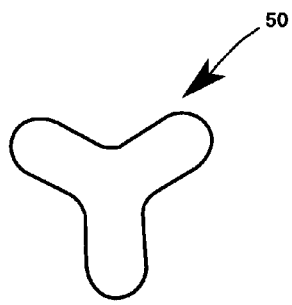
Fig. 8
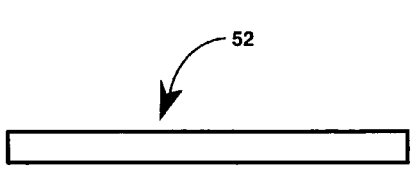
Fig. 9
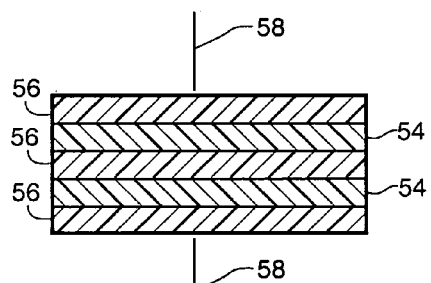
Fig. 10
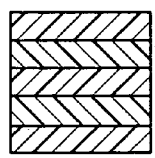
Fig. 11
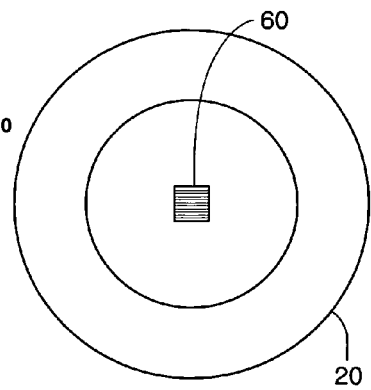
Fig. 12
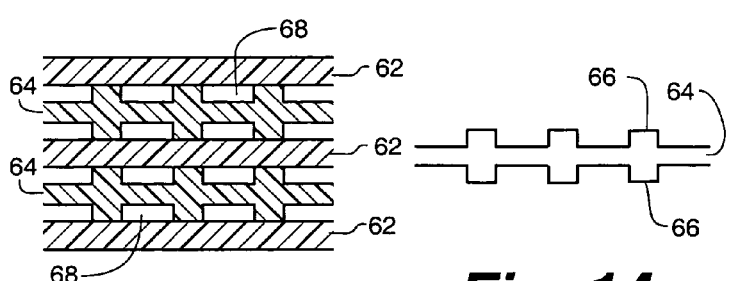
Fig. 13   Fig. 14
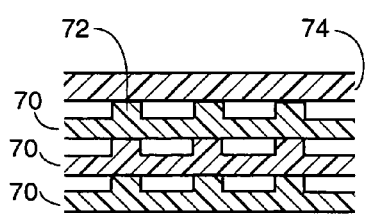
Fig. 15

AIR-ADMITTANCE DEVICE AND METHOD FOR MAKING SAME

CROSS REFERENCE TO RELATED APPLICATION

This application is a Continuation-In-Part of application Ser. No. 10/144,571, filed May 13, 2002 now U.S. Pat. No. 6,818,162.

RIGHTS OF THE GOVERNMENT

The invention described herein may be manufactured and used by or for the Government of the United States for all governmental purposes without the payment of any royalty.

BACKGROUND OF THE INVENTION

The present invention is directed to baby-feeding nipples, and, in particular, relates to baby-feeding nipples based on capillary action.

At present there is no baby bottle nipple on the market that even closely approximates the attributes of the human breast nipple, which delivers a continuous supply of milk without entrained air and without hard sucking until the reservoir is empty. In addition, as the baby bites on the human nipple, although it hurts the mother, the fluid flow is not completely cut off.

Commercial baby bottle nipples are made in the form of a hollow rubber shell with a feeding-tip extending from a bulbous portion, which is carried on a flexible and pliable outwardly extending flange. The types of nipples on the market differ principally in the number, size, and types of holes or slits in the feeding-tip and in the external shape that fits into the infant's mouth. In contrast to the human nipple, there are several inherent problems associated with this design. As the baby sucks on the nipple and drains the bottle, the pressure inside the bottle is gradually reduced, resulting in a vacuum. As the baby continues to suck, the pressure will ultimately be reduced to such an extent that the nipple collapses and liquid can no longer be sucked out by the infant. At this point the infant becomes frustrated and sucks harder, frequently swallowing air, which is very undesirable since it results in colic and/or the need for burping. In addition, if the baby bites on the hollow nipple, or if particulates clog the nipple holes, the flow is totally cut off and no fluid is delivered. This also frustrates the infant. Finally, dentists have found that current nipple technology damages a baby's bite; they recommend that babies breast feed rather than use current nipple technology.

It is obvious that there is a need to improve on the current state-of-the-art in baby feeding technology. There have been numerous attempts in the past to improve upon baby-feeding technology, in particular, nipple design. In fact, in the patent literature there are scores of patents in this area, some of which go back more than a century. To address the problem of a vacuum forming in the bottle, there have been numerous means to allow the entrance of air. One of the oldest examples, from 1901, involved the use of a concentric nipple design. Other examples involve the use of a tube or check valve in the nipple mounting flange or an air valve on the side of the bottle to let air into the bottle. An alternate approach to compensate for the vacuum is to use a collapsible plastic sac inside a baby bottle shell. In operation, the sac collapses during feeding, thus minimizing the amount of air that the baby ingests. A recent example (U.S. Pat. No. 6,053,342) involves the use of a flexible diaphragm with slits for pressure equalization.

Even with these improvements, the baby can still close off the nipple by biting, can still swallow air, and, in contrast to the human breast, the baby must suck harder to get the fluid. To alleviate this last problem and deliver fluid to the infant without hard sucking, several different versions of a nipple pump with a check valve have been proposed, for example, U.S. Pat. No. 2,960,088. These pumps are actuated by the infant biting on the nipple. Each time the infant presses down on the nipple, fluid is squirted into its mouth and each time the infant releases the nipple, the nipple is refilled.

For more than a century there have been scores of improvement patents for a baby bottle system that delivers fluid to an infant. Some of these have involved the fluid container, others have involved the nipple, and still others have involved both. To the applicants' knowledge the only two significant improvements over the past century that are in commercial production are the collapsible sack and the elastomeric diaphragm with resealable perforations both of which help to eliminate the sucking of air by the infant. Most other approaches tend to be complex in construction, difficult and expensive to manufacture, difficult to clean and sterilize, or simply do not function as described.

Although two separate systems for dealing with the vacuum generated inside of the bottle are commercially available, it should be noted that there are still shortcomings associated with these two approaches. The thin plastic bag that collapses during feeding minimizes but does not eliminate ingestion of air and must be replaced after each feeding, because it cannot be sterilized. This, of course, results in a continuing expense beyond that of the initial expense of the bottle and nipple.

The elastomeric diaphragm with resealable perforations, being a mechanical type of check-valve, also possesses the shortcomings associated with this type of system. Like all check-valves, it is susceptible to leakage due to incomplete closure. This can result from clogging, such as particulates lodging in the slit, or from distortions in the slits. These distortions can be caused by elastomeric material changes (resulting from prolonged exposure to heat or sunlight for example) or from mechanical stresses on the edges of the slits as they open or close. In addition, like all check-valves, there is a threshold value at which each of the valves open. This threshold value, because it has to keep the valve from leaking, has to be significant and can exceed the sucking effort of a weak infant, especially after changes resulting from either time or usage. Of course, the valve will not function at this point. Additionally, if, for example, a sugar-based fluid is placed in the bottle and then allowed to dry on the diaphragm, the slit valves will not open at all until the sticky substance is removed. Finally, it should be noted that it is very difficult to clean residual fluid and bacteria from the slits when they are in their normally closed position. This can result in illness.

Clearly there is a need for a simple, inexpensive baby bottle nipple that more closely resembles the human breast nipple and its positive attributes.

Accordingly, it is an object of the present invention to provide a process for making a nursing nipple that delivers milk or water-based fluid to an infant without hard sucking by means of capillary pressure in the same way as the human breast.

Another object of the present invention is to provide a process for making a nipple with microscopic fluid pathways that cannot be closed-off when an infant bites on them and are easy to completely clean and sterilize.

Yet another object of the present invention is to provide a process for making a nipple having leak-proof hydrophobic microscopic pathways that are always open to relieve the slightest vacuum.

A further object of the present invention is to provide a process for making a nipple having an integral microscopic filter in the nipple that will keep particulates from clogging the nipple.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there are provided methods for fabricating baby bottle nipples which mimic the function of the human breast nipple. In the human breast nipple, milk is delivered to the baby through 15-25 fluid-delivery capillaries called lactiferous ducts. These ducts are 2-4 centimeters in length and 500-900 microns in diameter. Baby bottle nipples fabricated in accordance with the methods of this invention have the common feature of at least one hydrophilic fluid delivery passage. In one embodiment, the fluid delivery passage is a microtube, as hereinafter described. In another embodiment, the fluid delivery passage is a microchannel, also hereinafter described. In yet another embodiment, the fluid delivery passage comprises a porous reticulated foam with interconnected pores. In each of these embodiments, the fluid delivery passage has at least one dimension in the range of 1-2000 microns. Also provided are processes for fabricating filters for separating solids from liquids.

All the nipples described in this application function on the basis of capillary pressure and thus the interior walls of the fluid-delivery passages in all the nipples in this application are made of, converted to, or coated with, a hydrophilic material that milk, water, juice, or other water-based liquids will wet. If the interior surface of the fluid-delivery passage is wet by the water-based fluid, then when there is a water-based fluid reservoir in contact with the bottle side of the nipple, the water-based fluid will be sucked into the fluid-delivery passages. That is, if the contact angle between the liquid and the capillary surface of the passage is 90° or less, there will be no resistance to the flow of the liquid. In addition, the smaller the contact angle or the smaller the capillary passage, the greater will be the capillary force drawing the liquid into the capillary. There are two additional positive ramifications resulting from using a capillary with a hydrophilic wall for fluid-delivery. In contrast to prior art, not only will this type of capillary be extremely easy to clean and sterilize, but in addition, if the infant partially closes off the pathway by biting on the nipple, the capillary pressure will increase, providing fluid at increased pressure through the smaller opening in the feeding tip. Thus, like the human nipple, this invention provides milk at the baby's end of the nipple without hard sucking. This means that, using the present technology, the shape of the nipple can be much closer to that of an actual human breast. In addition, these fluid-delivery passages embedded in a solid or non-reticulated porous flexible nipple body (like the human nipple) will not be easily closed off if the baby bites on the nipple. This solid or non-reticulated porous flexible nipple will therefore not adversely affect the baby's bite as is common with hollow nipples.

In addition to the features already mentioned, the nipples described in the present application provide a means for letting air into the bottle in a continuous fashion without a pressure threshold, thereby eliminating the vacuum generated by the sucking infant. This is accomplished by placing microscopic hydrophobic passages in the form of air-admittance channels or pores in an area of the nipple which is never in the infant's mouth. The walls of these air-admittance capillaries or pores are made of, converted to, or coated with a hydrophobic material so that air can enter the bottle, but the water-based fluid cannot flow out of the bottle if the minimum cross-sectional dimension is small enough. In the present invention, the cross-sectional dimension is usually less than 300 microns. With these small capillaries an adequate rate of air-admittance is achieved by using a plurality of air-admittance capillaries.

Finally, some of the nipples described in the present application incorporate an integral microscopic filter to keep the capillaries or passages that deliver water-based fluid to the infant from clogging. The walls of the pores or channels in this microscopic filter are fabricated from or coated with a hydrophilic material. The minimum cross-sectional dimension of the pores or capillaries in the filter must be smaller that those that deliver milk or other water-based fluid to the infant so that they can effectively keep particulates that would clog the fluid-delivery pores or capillaries from entering the nipple.

BRIEF DESCRIPTION OF THE DRAWINGS

In the drawings:

FIG. 8 illustrates a trilobal capillary shape;

FIG. 9 illustrates a rectangular capillary shape;

FIG. 10 illustrates film lay-up for fabrication of rectangular capillaries;

FIG. 11 illustrates a rectangular capillary core member prior to removal of sacrificial materiel;

FIG. 12 is an end view, from the attachment end, of a nipple having rectangular capillaries;

FIG. 13 illustrates an alternate lay-up for fabrication of rectangular capillaries;

FIG. 14 illustrates a film-like member having projections on both sides for use in the lay-up shown in FIG. 13;

FIG. 15 illustrates another alternate lay-up for fabrication of rectangular capillaries;

DETAILED DESCRIPTION OF THE INVENTION

Figure 1:
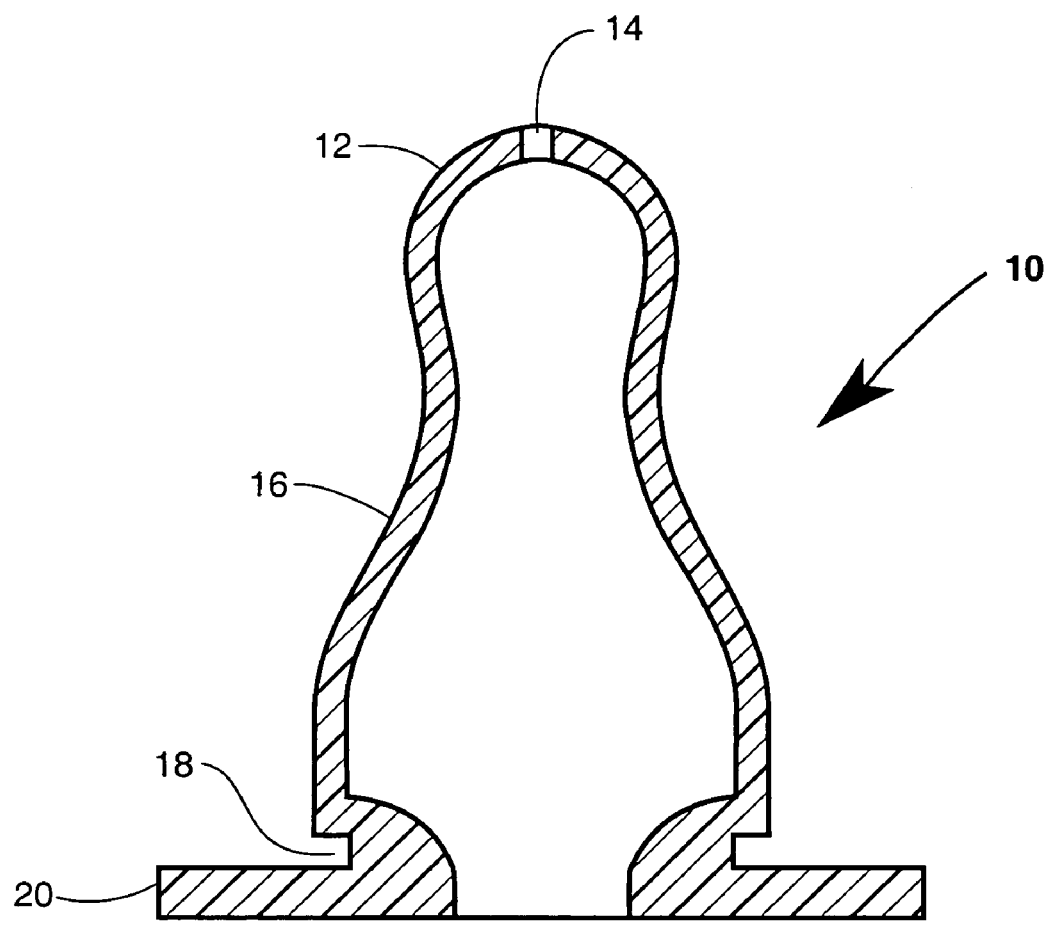
FIG. 1 is a cross-section through the center of a prior art nipple.

Referring to the drawings, and in particular to FIG. 1, there is shown a prior art nipple, generally represented by reference numeral 10. Nipple 10 is designed for use in combination with a baby bottle, not shown. The baby bottle can be a plastic or glass (hard) bottle for dispensing liquids therefrom. Nipple 10 has a tip 12 at its top end, shown as rounded, but can be flat or have any shape as is known in the art. Tip 12 has an aperture 14 passing through its center to provide a conduit for the liquid to be dispensed from the bottle. Aperture 14 can be formed in any fashion and of any shape known in the art, such as a slit or slits. Below the rounded tip 12, the nipple 10 flares outward to form a torso 16. Torso 16 preferably has an annular indent 18, adjacent its lower end. Below torso 16, nipple 10 terminates in a radial or horizontal flange 20. Flange 20 assists in mounting nipple 10 in a retaining ring, not shown, and sealing the free edge of a bottle when the nipple is mounted onto the bottle. Annular indent 18 facilitates alignment and securing of nipple 10 in a retaining ring.

Figure 2:
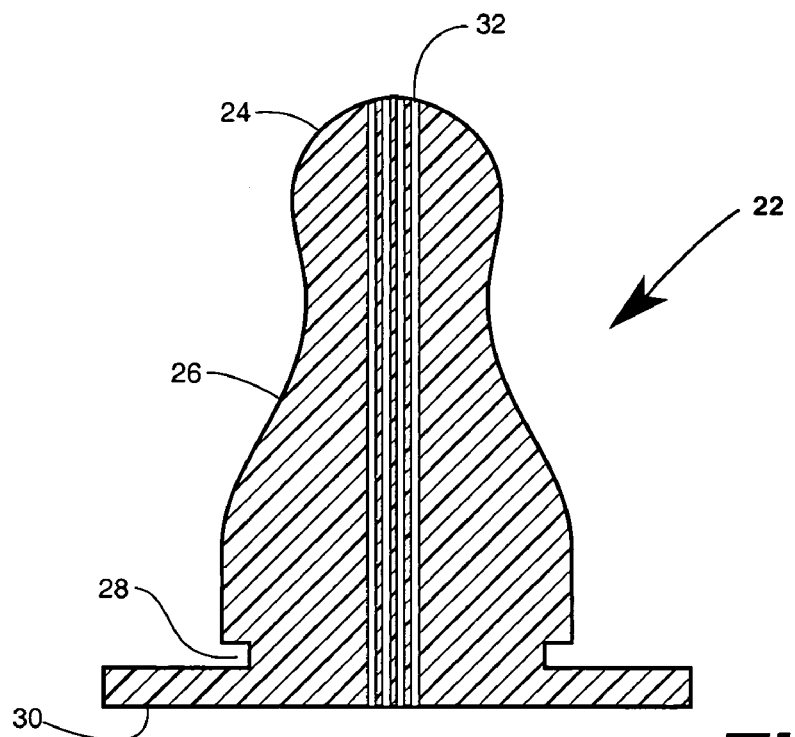
FIG. 2 is a cross-section through the center of a nipple having a plurality of fluid-delivery passages.

Referring to FIG. 2, there is shown a nipple according to the present invention, generally represented by the reference numeral 22. Nipple 22 is designed for use in combination with a baby bottle, not shown. The baby bottle can be a plastic or glass (hard) bottle for dispensing liquids therefrom. Nipple 22 has a rounded tip 24 at its top end. Tip 24, which is shown as rounded, but can be flat or have any shape. Below the rounded tip 24, the nipple 22 flares outward to form a torso 26. Torso 26 preferably has an annular indent 28, adjacent its lower end. Below torso 26, nipple 22 terminates in a radial or horizontal flange 30. Flange 30 assists in mounting nipple 22 in a retaining ring, and sealing the free edge of a bottle when the nipple is mounted onto the bottle. Annular indent 28 facilitates alignment and securing of nipple 22 in a retaining ring.

The body of nipple 22 is solid and has at least one fluid-delivery passage 32 extending from the termination of tip 24 toward the flange end of nipple body 22 that makes contact with the fluid in the aforementioned bottle. Each fluid-delivery passage 32 has a hydrophilic interior surface, at least one cross-sectional dimension in the range of 1-2000 microns and is aligned in such an orientation as to deliver water-based fluid from the bottle or other container to a sucking infant on the other end by capillary action.

In this embodiment, the baby bottle nipple employs microtubes as fluid delivery passages. Microtube technology is disclosed in U.S. Pat. Nos. 5,011,566 and 5,352,512. Briefly, this technology comprises placing a coating on a sacrificial fiber or fibers and then removing the fibers. If the space between the coated fibers is not filled in, tubes will result. However, if the space between the coated fibers has been filled in, capillaries will be produced when the fibers are removed. The inner dimensions and contours of these capillaries will perfectly match the dimensions and contours of the fiber surfaces from which they were formed if the material is rigid.

Before continuing with the detailed description of the present invention, it is prudent to define some terminology. This is necessitated by the fact that microtube and thin-film layering technology offers the capability to make microscopic passages that have heretofore been impossible to fabricate.

Historically, names for thread-like filaments and tubes with small diameters and high-aspect ratio have been material- and sometimes application-sensitive. For example, if a filament is spun from cotton, glass, or a polymer, it is called a "fiber", while if its composition is metallic it is termed a "wire". In a similar way, a small tube drawn down from a larger glass tube is usually called a "capillary", while a polymer filament extruded in tubular form is called a "hollow fiber". A small tube made from human tissue it is called a "duct", while a small diameter metallic tube used to extract fluid from the body is called a "cannula".

The term "capillary" has traditionally referred to a small round tube because historically it has only been possible to form microscopic round tubes. The reasons for this lie in manufacturing technology. That is, capillaries are usually drawn from glass tubing and the effect of surface tension on the soft glass wall of the tubing being drawn precludes the fabrication of non-rounded features.

With the advent of microtube and thin-film layering technology these traditional historical terms have become blurred. The term "fiber" is used in this application in its broadest sense and refers to natural or synthetic filaments of any material, such as polymer, cellulose, glass, ceramic, or metal. The term "microtube", in turn, encompasses microscopic tubes that are formed by coating fiber substrates and then removing the fiber substrate leaving a microscopic tube. The term "capillary" is used in this application to describe microscopic channels of any cross-sectional and axial shape made from any type of material and imbedded in a solid structure. This term was chosen because the nipples described in this invention function on the basis of capillary attraction. Some of the capillaries in this application are fabricated by means of microtube technology while others are not. These microtubes can have non-circular shapes, due to the fact that the fugitive fibers from which the microtubes are fabricated can have non-circular shapes because they are not hollow. When non-circular fibers are coated and the fibers are thereafter removed, a non-circular tube, channel, or capillary is produced.

A first step of manufacture is to select a material for the nipple body. Such materials are widely known in the art, including silicone rubber, latex and other elastomeric materials. Ideally, the material used should simulate the mother's natural nipple in texture, surface quality, resiliency, and rigidity. In fact, different types of latex (or other material) having different characteristics may be used in the same article.

Another first step of manufacture using microtube technology is to select a suitable fugitive fiber or fibers. The fiber can be of any composition, such as metal, polymer, glass, or carbon. A polymer is preferred for many applications since it possesses controlled elasticity and is easy to remove by methods such as solvation, depolymerization, reaction, phase change and the like. The fiber can have almost any axial or cross-sectional shape and can have any dimensions needed for the application as long as at least one cross-sectional dimension is in the range of 1-2000 microns. Depending on the size of the capillary formed, it is possible that only one capillary will be needed for delivery of water-based fluid through the nipple.

Fibers with different compositions, cross-sectional and/or axial shapes and dimensions can be used to form a single nipple. The main requirement for the sacrificial or fugitive fiber is that it be chosen so that the procedure used to remove the fiber does not adversely affect any material used in the nipple. It is usually preferable to use a porous or hollow fiber where possible in order to aid removal of the fiber. For the baby nipple, the preferred polymer fiber is made of polyvinyl alcohol because such fiber can be removed by dissolving in water at an elevated temperature. This removal process is non-toxic, thus leaving behind no toxic solvent and, as a benefit, would pre-sterilize the nipple for use. Other sacrificial materials include treated soy protein and corn zein.

Nipple 22 is fabricated by placing at least one sacrificial or fugitive fiber in a suitable mold, fixture, extrusion or pultrusion device, with an orientation principally along the axis of the nipple and, if a plurality of fluid-delivery passages are desired, with a desired spacing between pieces of fugitive material. This spacing can be maintained mechanically or by pre-coating the fugitive fiber with the nipple body material, or other suitable material. Sufficient nipple body material is then provided to fill the interstices between the pieces of fugitive material and to form the external dimensions of the nipple body. After solidifying the nipple body material, by appropriate technique, the nipple is removed from the mold, fixture, extrusion, or pultrusion device, and, if necessary, nipple body material is removed to bring the nipple to final external dimensions. Sufficient solidified nipple body material is removed from the tip end and from the flange end to expose the end(s) of the fugitive fiber(s). The fugitive fiber(s) is(are) removed as described previously, thereby leaving fluid-delivery passages with interior dimensions equal to or less than the external dimensions of the fugitive material.

The sacrificial fibers can also be aligned and held in position by other means, such as by wrapping around a large mandrel, flocking, fixturing, centrifugal force, electrostatic force, or magnetic force. For example, fibers that can be magnetized, such as some metals and ceramics, can be aligned parallel to each other in a magnetic field because of the ratio of their length to cross-sectional dimensions. Non-conducting fibers can be aligned similarly in an electrostatic field. Any type of fibers with significant length to cross-sectional dimension ratio can easily be aligned along the radius of a centrifuge provided one end is immobilized. Regardless of the technique used to align the fibers parallel to each other, the spacing between adjacent fibers can be controlled by coating the fibers before alignment. If the coating on all the fibers is uniform, the thickness of this layer of material on each fiber is usually equal to half the desired separation distance of the capillaries. However, there is no requirement for all the fibers to have a coating with the same thickness. The coating on the fibers is at least partially solidified while the fibers are held in alignment to group a plurality of coated fibers together.

Although the fluid-delivery passages in the nipple need to be hydrophilic, it should be noted that the material used to make the nipple body need not be hydrophilic. If the material used to make the nipple body 22 is hydrophilic no additional manufacturing steps are needed because a water-based fluid will be delivered from the container end of nipple 22 to the feeding-tip 24 by capillary action. However, if this nipple body material is hydrophobic and is, therefore, not wet by milk or a water-based fluid, the capillary walls of the nipple can be treated, for example, chemically or with radiation to graft hydrophilic groups onto the nipple body material forming the inner capillary walls in order to make them either hydrophilic, or more hydrophilic. These treatments, which can include those employing self-assembled molecules or a low-temperature plasma, are preferably performed on the initial thin coating of nipple body material on the fibers before the space between them is filled. Alternatively, they can be performed on the finished nipple after the fibers are removed. In addition, an additive can be blended into the material forming the inner wall of the capillaries. This hydrophilic additive will ultimately diffuse to the surface of the inner wall of the capillaries and accumulate there forming a hydrophilic layer.

A wide variety of hydrophilic materials are available and described in the medical and patent literature. Examples of hydrophilic materials include naturally occurring proteins such as soy extract (Pro-Coat available commercially from Protein Technologies Int., St. Louis Mo.) and polymers such as nylon 66, hydrophilic polyurethane (Hydrothane™ available commercially from Cardiotech Int., Woburn Mass.) acrylate, polyacrylonitrile, or methacrylate. Also suitable for treating or coating a hydrophobic polymer to make the surface hydrophilic are metallic coatings, fluoro polymers commercially available from Dupont, Slip-Coat® available commercially from STS Inc., Henrietta N.Y., as well as Chemstat® and Maxomer® both available commercially from Chemax Performance Products, Greenville S.C., hyaluronic acid, and surfactants such as the alkyl diethanolamides, including lauric diethanolamide and stearyl diethanolamide, glycerol esters and anionics. These materials may be applied by spraying, wiping, immersion, or other means, so long as appropriate measures are taken to provide a proper coating thickness, typically in the range from 0.025 $\mu$m to 1.0 mm, usually from 0.05 $\mu$m to 1 $\mu$m.

In a separate, but ultimately equivalent sequence of processing steps, the fibers can be coated with hydrophilic material before the nipple body material or nipple body material precursor is placed around the fibers. The requirements for this hydrophilic coating material are that it be non-toxic, insoluble in water to the extent that it is not significantly affected by boiling water, and not adversely affected or removed by the procedures used to place the nipple body material around the coated fibers or to remove the fugitive fiber.

Inasmuch as the nipples of the present invention deliver fluid to the feeding tip by capillary action, the nipples have the potential to deliver fluid at an undesired rate or when it is not desired. For example, if the baby bottle is tilted to the extent that fluid contacts the fluid delivery passages at the flange (bottle) end of the nipple, the fluid will drip out of the passages at the end of the feeding tip.

There are several conventional solutions for this dilemma. It is of course possible to stop the dripping, for example, by keeping the bottle upright or by placing a tight fitting cap-like device over the tip end 24 of nipple 22 or the entire nipple when it is not in use. Alternatively, a much more acceptable solution is to make a very short distance from the capillary exit in the tip 24, on the interior wall of the capillary, hydrophobic. There are a number of ways in which this can be done. If the material used to fabricate the nipple body is hydrophobic, then the hydrophilic coating or surface treatment on the interior surface of the fluid-delivery passages can be employed everywhere along the capillary walls except for a short distance extending inward from the exterior end of tip 24. That is, for example, either the hydrophilic coating is not applied in this region or it is removed from this region, for example by mechanical or chemical means. If the nipple body material is hydrophilic, then the feeding-tip 24 can be treated by a process consisting of a mechanical process, chemical process, low temperature plasma, or radiation in order to make a small portion of the length of the fluid-delivery passages extending inward from the exterior end of the baby feeding-tip hydrophobic. Alternatively, a hydrophobic layer can be applied to the capillary wall for a short distance extending inward from the exterior end of feeding-tip 24. This short distance can range from about two capillary diameters or thicknesses, up to about ⅛-inch.

A wide variety of hydrophobic coating materials are available and described in the literature. Suitable coating materials include fluoropolymer coatings, such as Fluoropel, Fluorothane ME, Fluorothane MU, and Fluorothane M1 available commercially from the Cytonix Corp., Beltsville MD, as well as those available from DuPont. In addition, almost all polymers known are hydrophobic and can be used as coatings. These materials may be applied by spraying, wiping, immersion, or other means, so long as appropriate measures are taken to provide a proper coating thickness, typically in the range from 0.025 $\mu$m to 0.5 mm, usually from 0.05 $\mu$m to 1 $\mu$m. these coatings must not be soluble in boiling water, non-toxic, and not affected by manufacturing procedures subsequent to their application.

Regardless of how the hydrophobic region extending inward from the exterior end of the feeding tip is created, its presence provides another function in addition to that of preventing unwanted dripping. That is, it allows the water-based fluid to go up the entire capillary to the very end of the feeding tip and then stop. This brings the fluid very close to the infant's mouth and eliminates hard sucking, but allows him to control the amount that he receives in a given time by the strength of his sucking. Thus, fluid will not be delivered too quickly for the infant to swallow it. Obviously, the amount of liquid that the infant receives for a given sucking effort can also be accurately controlled by the dimensions of the fluid-delivery pathways. This is not possible with the prior art.

Figure 3:
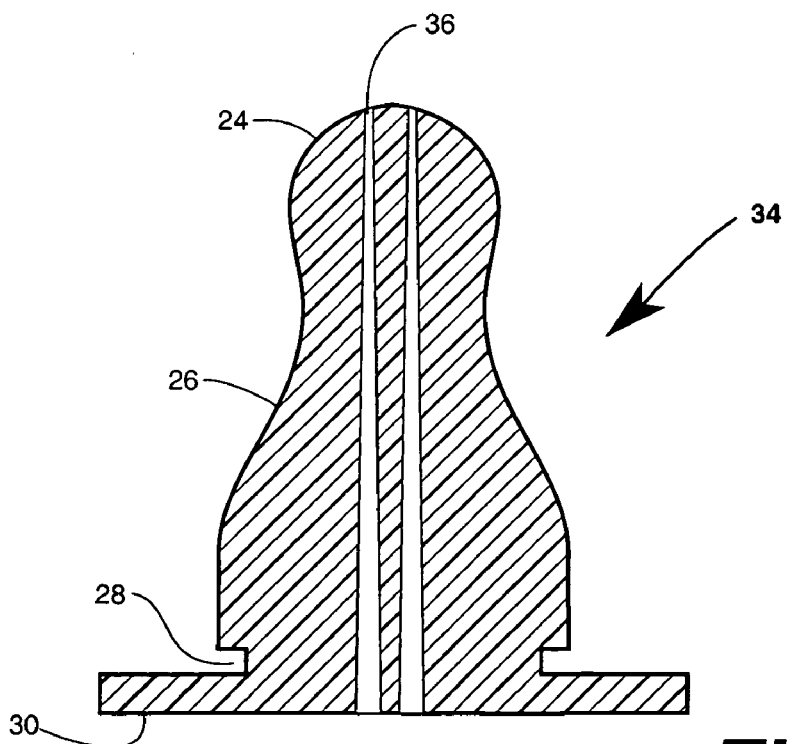
FIG. 3 is a cross-section through the center of a baby nipple with tapered fluid-delivery passages.

Since microscopic capillaries with variable axial geometry can be produced using microtube technology, tapered fluid-delivery passages or capillaries, such as seen in FIG. 3 can be produced. FIG. 3 shows a baby nipple 34 with tapered fluid-delivery passages 36. The taper of passages 36 is exaggerated for the purpose of illustration. Other reference numerals in FIG. 3 are the same as in FIG. 2, since the elements are the same. Fluid-delivery capillary passages of this shape will increase the fluid flow to the baby when compared to a capillary passage with a constant diameter equal to the minimum diameter of the tapered capillary. At the same time the tapered capillary will preferentially direct fluid flow towards the baby's mouth.

Figure 4:
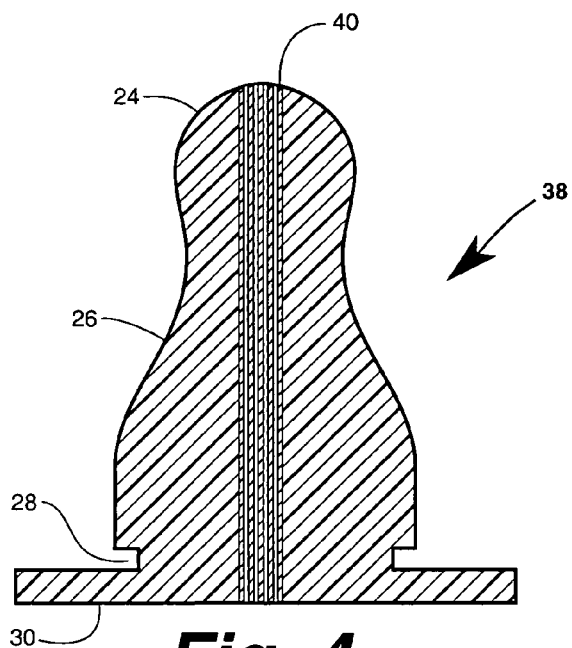
FIG. 4 is a cross-section through the center of a baby nipple with a separately fabricated core comprising a plurality of fluid-delivery passages.
Figure 5:
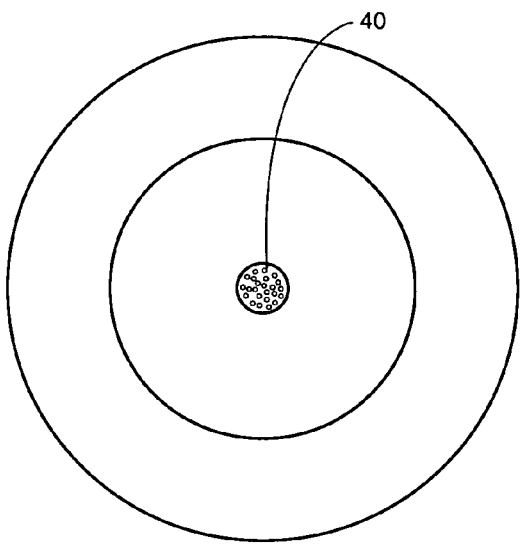
FIG. 5 is an end view, from the attachment end, of the nipple of FIG. 4.
Figure 6:
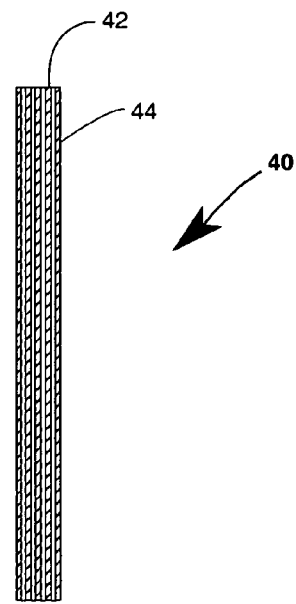
FIG. 6 illustrates the separately fabricated core of the nipple of FIG. 4.

Nipples 22 (FIG. 2) and 34 (FIG. 3) are of single piece construction, with the nipple body made from a single elastomeric material. It is also possible to provide a nipple fabricated from at least two components, composed of the same or different materials. Referring to FIGS. 4 and 5, there is seen a nipple 38. Reference numerals 24, 26, 28 and 30 are the same as in FIGS. 2 and 3 because the elements are the same. Nipple 38 differs from the previously described nipples in that nipple 38 comprises a separately fabricated capillary bundle core 40. The body of core 40, shown separately in FIG. 6, is solid and has at least one fluid delivery passage 42. Each fluid-delivery passage 42 has a hydrophilic interior surface, at least one cross-sectional dimension in the range of 1-2000 microns and is aligned in such an orientation as to deliver water-based fluid from the bottle or other container to a sucking infant on the other end by capillary action.

The nipple core 40 can be fabricated by numerous means such as molding, dipping, pultrusion or extrusion in which the capillary-forming fiber or fibers are held in the desired position for producing a core perform. Nipple core material 44, which can be the same as or different from the elastomeric material used to form the nipple body, is then placed around the at least one fiber until the lateral dimensions of the nipple core are achieved. If there is more than one fiber, nipple core material 44 is used to completely fill the space between the fibers, and also to surround the outer fibers forming a consolidated core preform. Alternatively, other means such as, coating the fibers using a liquid, vapor, or gaseous nipple body precursor material can be used followed by any necessary conversion to the nipple core material.

As mentioned above, the material 44 used to form the core 40 can be the same or different from the elastomeric material used to form the nipple body. For example, the nipple core material may be more firm or rigid than the nipple body material in order to better keep the fluid-delivery capillaries open when the baby bites on the nipple. In addition, it should be noted that it is not necessary for the elastomeric nipple body material to be hydrophilic. That is, the nipple core material can be hydrophilic while the elastomeric nipple body material is hydrophobic. Alternatively, if the nipple core material is also hydrophobic, the fugitive fiber can be coated or the inner surfaces of the capillaries formed after fugitive material removal can be treated or coated as described above to make them hydrophilic.

Since the nipple core 40 does not have radial dimensions that equal or exceed the exterior nipple dimensions, additional material must be added to form the finished nipple. Nipple core 40 is placed in a suitable mold. Sufficient nipple body material is then injected into the mold to fill the mold. After solidifying the nipple body material, by appropriate technique, the nipple is removed from the mold and sufficient solidified nipple body material is removed from the tip end and from the flange end to expose the end(s) of the fugitive fiber(s). The fugitive fiber(s) is(are) removed as described previously, thereby leaving fluid-delivery passages with interior dimensions equal to or less than the external dimensions of the fugitive material.

Alternatively, nipple body material can be placed around the consolidated core preform producing a body larger than needed for the nipple. This might be done, for example, by pultrusion in a continuous or sequential process. Using this technique, the consolidated core preform surrounded by the nipple body material would have to be both cut to length and perhaps have excess nipple body material removed to obtain the final dimensions needed for the nipple.

Figure 7:
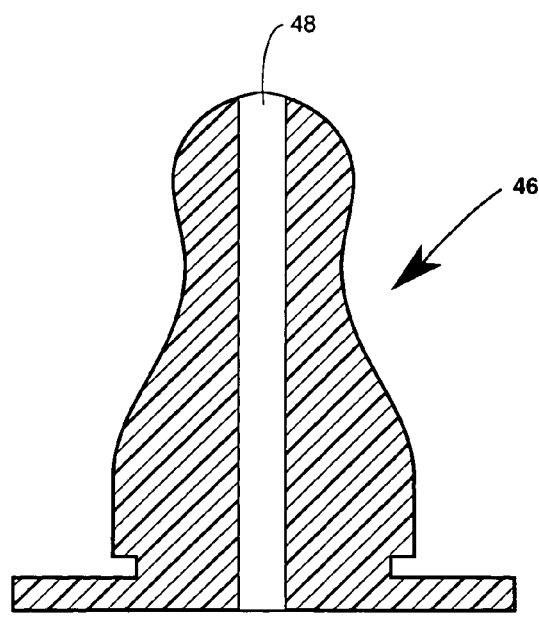
FIG. 7 is a cross-section through the center of a baby nipple having a hollow center portion.

In another approach, shown in FIG. 7, a consolidated core preform and a nipple body 46 with net external dimensions and a hollow central portion 48 positioned along the principle axis can be fabricated separately. In this case the interior dimensions and shape of the hollow central portion 48 of the nipple are approximately equal to the exterior dimensions and shape of the consolidated core preform 40. The nipple body with a hollow central portion would then be placed around the consolidated core preform of appropriate length and friction-fitted, bonded and/or sealed to it with a leak-free interface. It should be noted that if the hollow central portion 48 in the nipple body is slightly smaller in dimension than those of the consolidated core preform, it is possible to form a leak-free interface simply by friction. However, if the dimensions are approximately equal or if the dimensions of the consolidated core preform are slightly smaller than those of the nipple hollow core in the nipple body, some sort of a seal will be required to make a leak-free interface. Placing the consolidated core preform in the nipple body can be done in a number of ways such as, sliding the consolidated core preform into the hollow nipple body or segmenting the hollow nipple and then rejoining the parts. If both the consolidated core preform and the nipple body were tapered or if the hollow central portion in the elastomeric nipple body were slightly undersized a leakfree interface could be formed without any heat, sealant or bonding material. Of course, the consolidated core preform could be placed and then bonded or sealed in a piece of nipple body material larger than needed for the nipple. However, this requires an additional step of removing excess nipple body material. Regardless of how the complete nipple is formed, in the final step, the fibers are removed to produce the capillaries by a process appropriate for the particular fiber such as reaction, solvation, phase change, or other appropriate technique that does not adversely affect the flexible solid material of the nipple or the material of the core. It should be mentioned that in many cases it may be necessary to remove some nipple core material from the ends of the fibers in order to remove them.

Finally, in all of these nipples made with a core it is important to mention that the length of the nipple core does not have to equal the length of the nipple body. For fluid delivery it is necessary that the fluid delivery capillaries be the same length as the nipple core. However, it is not necessary that the length of the core equal that of the body. For example, the core can be placed only in the upper tip region of the nipple, which still keeps the tip portion that is in the infants mouth from closing off. In this design, the lower body of the nipple is hollow and thus part of the fluid reservoir. This design is closer to the conventional nipple design and requires less material to manufacture than a nipple with a core length that equals the length of the nipple.

If fugitive material is used to form the hydrophilic fluid capillaries in a nipple core, there is another means to fabricate hydrophilic capillaries with a short hydrophobic region. In this method at least one piece of fugitive material is placed and held vertically in a container. (Alternatively, the fugitive material can be placed in a centrifuge tube and held parallel to the axis of the tube by centrifugal force.) This container can either be a mold with the radial or transverse dimensions of the nipple core or can be a larger container in which more than one core can be formed simultaneously. If there is more than one piece of fugitive material they can be aligned and held parallel to one another and placed vertically in a container. Hydrophilic material is then placed in the container to fill the space between the fibers to a height, which is equal to or greater than the desired length of the hydrophilic region of the capillary. When the hydrophilic material has solidified and cured, hydrophobic material is added to fill the space between the fibers to a height that is equal to or greater than the length of the desired hydrophobic region of the final capillary. After the hydrophobic material is solidified and cured, individual nipple cores are removed from the molds or from the solidified slab and then shaped by cutting, punching, or coring the solidified material parallel to the principal axis of the fugitive material. After the core cross-section is shaped, material can be removed from the ends if necessary to bring the length of the hydrophilic and hydrophobic regions to the desired length. The final step in making the core is to then remove the fugitive material. Of course, the process of filling the space between the fibers can be performed in reverse starting with the hydrophobic material. In addition, if the hydrophobic and hydrophilic core material are not miscible, there is no need to cure the first material before the second is added.

An alternate technique to produce a hydrophobic region at the tip of the nipple, is to incorporate a very short space between the core and the external tip. This space acts as a reservoir between the hydrophilic capillaries in the core and microscopic hydrophobic passages in the form of capillaries, pores, or holes in the tip. These hydrophobic passages in the tip can be in the form of microscopic holes formed in a thin section of nipple body material in the tip or in the form of a thin hydrophobic membrane inserted in the tip. The combination of capillaries and reservoir work together to bring liquid to the tip while the hydrophobic passages in the tip prevent liquid from exiting the nipple unless there is a slight pressure differential.

The cross-sectional shape of the capillaries in this application can be any desired shape. For example, the fibers used to create the capillaries can have the shape of a "C", an "X", a "Y", a "V", or the like. For baby bottle nipples some of the preferred shapes for the cross-section of the capillary include trilobal 50, as shown in FIG. 8, as well as rectangular 52 with a high-aspect cross-sectional ratio (width:height), as shown in FIG. 9. These cross-sectional shapes have the feature of being difficult to clog with particulates. With the rectangular cross-section, if the capillary walls are rigid, the smaller dimension can be made as small as practical to increase capillary pressure on a wetting fluid while the larger dimension can be increased to allow maximum throughput of liquid. Obviously, nipples can be fabricated with rectangular cross-sectioned capillaries using materials with rectangular cross-section and procedures as described previously.

In yet another approach, a core preform with rectangular cross-sectioned capillaries can be fabricated using a stacking layer approach that makes use of fugitive layers rather than fugitive fibers. Referring to FIG. 10, layers of fugitive material 54 are laid up in alternate layers with capillary separation material 56, i.e., the material that separates the capillaries which can be the same as or different from the nipple body material, to a desired thickness, e.g., about 1-6 mm. The resulting assembly is then consolidated into one piece using heat, pressure, solvent, or the like. Following consolidation, individual nipple cores can be machined or cut from this one piece, for example, by cutting along the cut lines 58, thus providing a nipple core 60, as shown in FIG. 11.

Alternatively, this build-up of alternate layers of fugitive and capillary separation material can be accomplished using techniques such as, extrusion of individual or multiple layers, pultruding one layer material while filling in with the other, spraying layers, casting layers, lay-up of films, and the like. These processes can be continuous or the layered structures can be formed in a batch process. The product of this layering process can be large pieces of layered material from which individual layered structures are cut or machined, or layered structures or complete nipples can be fabricated individually, for example in a mold. By using layers of varying thicknesses and widths, the shape of the capillaries can be controlled. Thus, it is possible with this technique to produce tapered capillaries.

Using the lay-up technique, the constrained layers can be formed into a free-standing layered structure in which the alternating layers of capillary separation material and fugitive material are formed into one piece using heat, evaporation, pressure, solvent, pultrusion, adhesives, curing, mechanical interlocking, etc. It should be noted that the technique employed to produce a layered structure must produce a capillary separation layer with a hydrophilic surface after the fugitive material is removed. To aid in removal of the fugitive material it is possible to leave minute gaps (on the order of microns or tens of microns) between portions of the fugitive and separation layers during fabrication. This will increase the rate of fugitive material removal without appreciably decreasing the capillary pressure and thus the delivery of the fluid to the infant.

Since the nipple core 60 does not have radial dimensions that equal or exceed the exterior nipple dimensions, additional material must be added to form the finished nipple. This can be accomplished, for example, by cutting the consolidated core preform to length and placing it in a hollow nipple body as described above or by placing it in a mold having the final shape of the nipple. The mold is then filled with elastomeric nipple body material or a nipple body precursor material and solidified producing a net-shaped nipple. The fugitive layers are then removed, as previously described for fugitive fibers. The resulting nipple is shown from the flange end in FIG. 12. Obviously, it is necessary to have only one capillary formed by the removal of one layer of fugitive material in order to transport fluid through the nipple. However, with more layers, they can be made thinner which increases capillary pressure and thus fluid delivery through each capillary formed by the removal of the thinner layers of fugitive material. An additional result is that thinner capillaries will decrease the amount of sucking effort on the part of the infant to obtain fluid through the nipple. In general, the fugitive layers should have a minimum thickness of about 20 microns with an aspect ratio (width to thickness) of about 100:1 to 10:1.

The preferred fugitive materials are non-toxic and water-soluble and include polyvinyl alcohol and natural water-soluble materials. The removal of the fugitive layers is enhanced if the layers of fugitive material are hollow or porous.

The surfaces of the capillary separation layers form the major walls of the capillaries after the fugitive material is removed. Nipple body material, nipple core material, another material such as a natural protein or a combination of materials can be used directly as a capillary separation layers if the surfaces of these capillary separation layers are hydrophilic. A combination of materials in the capillary separation layer can be used, for example, to modify and tailor the rigidity of the layered structure. If the individual capillary separation layers do not have a hydrophilic surface they can be surface-treated or coated with a hydrophilic material to make them either hydrophilic or more hydrophilic.

If the capillary slit formed by removal of the fugitive material has a significant width or length, it is possible for an infant to close the capillary by biting, if the material used to form the layered structure has sufficient flexibility. To allow the use of flexible materials or thin brittle materials, it is possible to incorporate supports that will help keep the capillaries open. These supports, which can be seen in FIG. 13, not only provide mechanical support but also decrease the lateral size of the individual capillaries. Numerous methods can be used to form these supports.

FIG. 13 shows a layered structure comprising a plurality of layers of plain, i.e., flat, sheet or film 62 alternating with a plurality of layers of shaped sheet or film 64. Referring to FIG. 14, it can be seen that the shaped layer 64 has projections or supports 66 on both sides. When layer 64 is stacked with layers 62, as seen in FIG. 13, with projections 66 aligned in the axial direction, the supports thus define a plurality of capillaries 68. Shaped layer 64 can be formed by molding, rolling, casting, extrusion, pultrusion or embossing. Obviously, the degree of layer separation and thus the capillary thickness can be controlled by the height of the supports 66, the depth of the depressions, or both. If desired, the recesses defined by supports 66, in FIG. 14, can be filled with a fugitive material to maintain structural integrity while the layered structure is being fabricated. A variant stacked structure is shown in FIG. 15, wherein a plurality of shaped layers 70 with projections 72 on one side are assembled with a single layer of plain sheet or film 74. Individual nipple cores can be machined or cut from this layered structure as described previously.

It should be noted that in layered structures of the type shown in FIGS. 13 and 15 that there are two differences from the previous layered structures. The first is that both surfaces of the shaped layers must be hydrophilic. The second difference is that if the individual layers are not well bonded to or held by the nipple body material, it is possible for the layers to shift with respect to one another. Depending on the number of slit-shaped capillaries this might significantly affect flow by eliminating some of the capillaries. To solve this problem the layers can be joined to one another using techniques, such as, gluing, bonding and mechanical interlocking.

Figure 25:
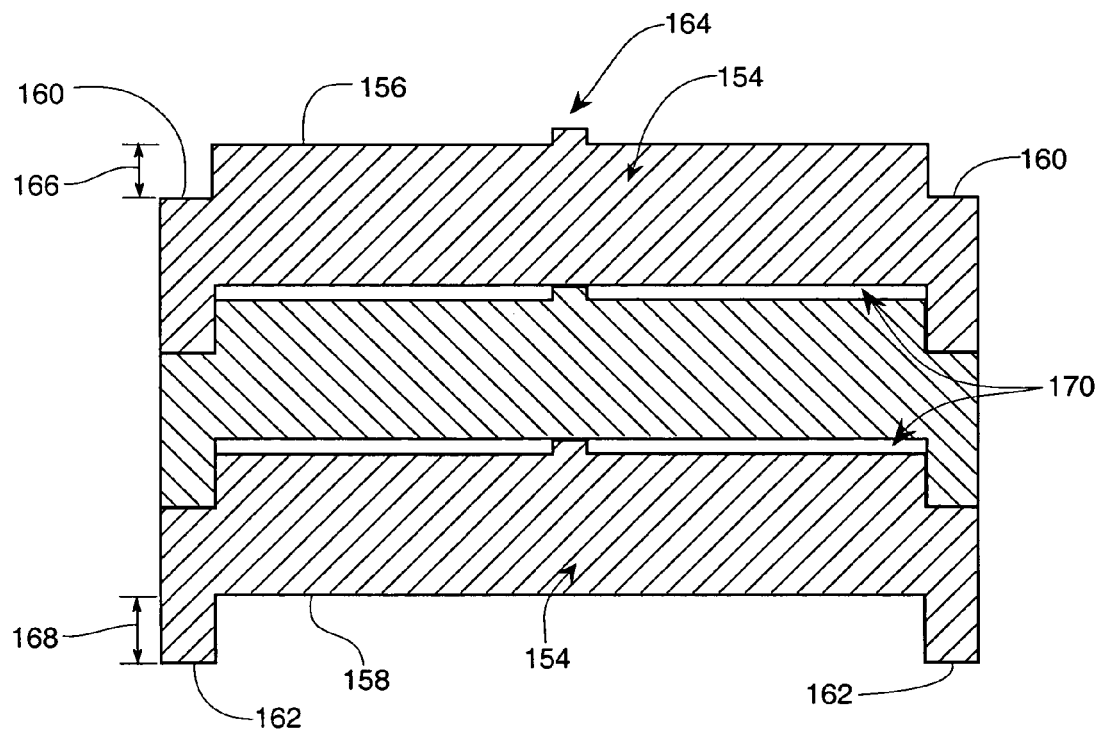
FIG. 25 is a cross-section of a nipple core formed by stacking and interlocking three pieces of material.

Mechanical interlocking to keep layers from shifting with respect to one another during manufacture or use can be accomplished in a number of ways. An example of mechanical interlocking of three layers 154 is shown in FIG. 25. Each layer 154 has a top face 156 and a bottom face 158. Each top face 156 has two depressions 160 and each bottom face 158 has two projections 162. Each top face 156 can also have an optional projections 164. Each depression 160 has a depth 166 and each projections has a height 168. Projection height 168 is greater than depression depth 166, so that when the layers 154 are fitted together, rectangular capillaries 170 are defined between layers. The projection 164 serves as a support in the center of each capillary 170 to keep the capillary open under applied pressure. The thickness of capillaries 170 and the height of projection 164 is equal to height 168 less depth 166. Those skilled in the art will recognize that more than one projection 164 can be used. In general, the height of projections 162 is about 40 to 1000 microns with a spacing between projections of about 100 to 1,500 microns, and the depth of depressions 160 is about 20 to 1000 microns with a spacing between depressions identical to said spacing between projections, and the difference between projection height and depression depth is at least 30 microns.

Figure 16:
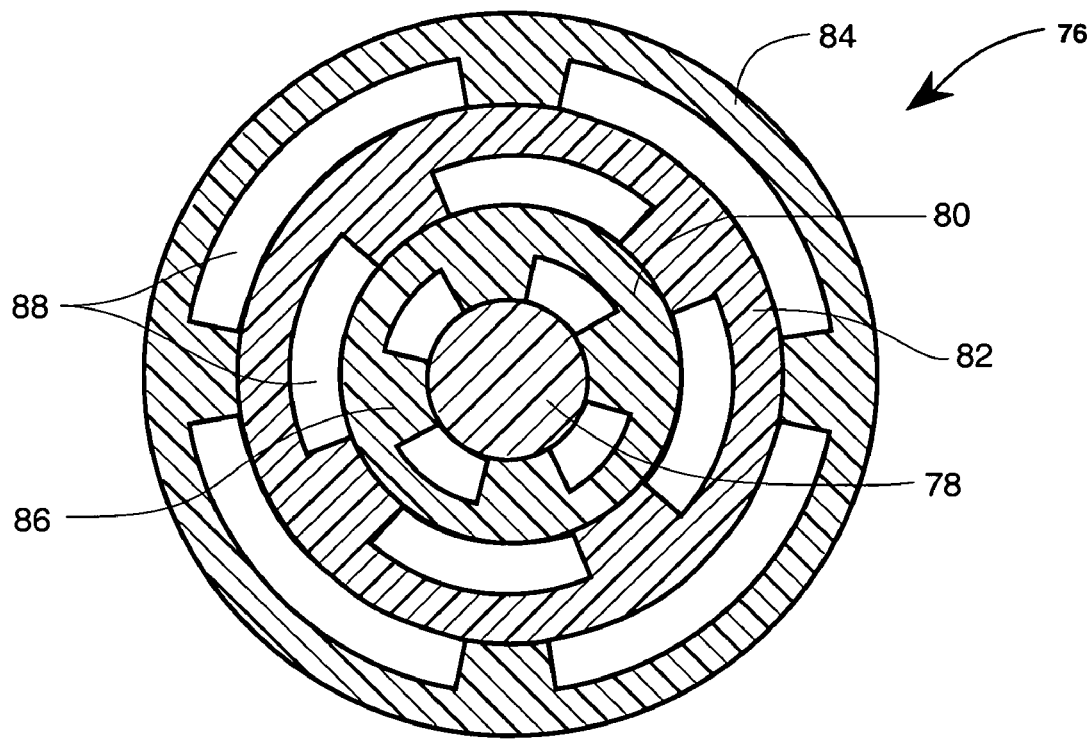
FIG. 16 illustrates an extruded nipple core with circularly configured capillaries.

Capillary layers can also be formed as concentric or near-concentric rings, as shown in FIG. 16. In this example, nipple core 76 has a solid core 78 with three concentric capillary-defining rings 80, 82 and 84. Each of the rings 80, 82 and 84 has a plurality of spaced apart, inwardly directed spacers 86 which define capillaries 88. Core 76 can be fabricated by co-extruding a suitable elastomeric core material with a suitable fugitive material filling the areas which, after removal of the latter, define the capillaries 88, through an appropriately shaped die. Alternatively, a similar core with a jellyroll structure can be fabricated by winding a shaped layer, such as item 70 in FIG. 15, around a solid core.

Another approach for making microscopic pathways in the nipple involves using hollow fibers. These can be spun individually and placed in a solid nipple or a single multi-hole hollow fiber can be extruded, directly producing a core with capillaries. Except for fiber removal, the processing of these hollow fibers into finished nipples is very similar to that already described for microtube technology starting with solid fibers. The use of hollow fibers is one of the preferred methods of fabrication if the material used to form the hollow fiber or hollow fiber bundle is a material of choice for the capillary wall. That is, with hollow fibers the step of fiber removal is eliminated. Thus, if the inner wall of the hollow fiber does not have to be coated, a multi-hole hollow fiber core can be easily extruded, cut to length and inserted in a prefabricated nipple body as described previously. Alternatively, the interior of the capillaries could be coated if necessary and the extruded and cut-to-length hollow fiber core could then be inserted into a mold and the material used to form the nipple body placed around it, if the material used to form the body does not wet the hollow fiber. The use of hollow fibers greatly decreases production time. Of course, this also applies to other forms of hollow tubing. In particular metallic tubing, such as 316L stainless tubing, which is robust, hydrophilic, and already used in food processing, can be employed.

Figure 17:
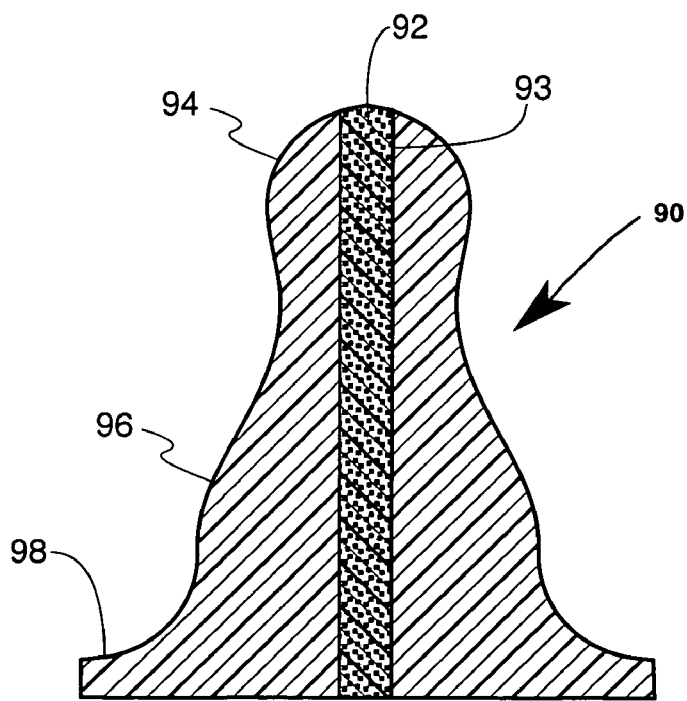
FIG. 17 is a cross-section through the center of a nipple having a reticulated porous core.

A further approach is shown in FIG. 17, which illustrates a nipple 90 having a reticulated porous core 92. Nipple 90 has a rounded tip 94 at its top end. Tip 94, which is shown as rounded, but can be flat or have any shape. Below the rounded tip 94, the nipple 90 flares outward to form a torso 96. Below torso 96, the nipple flares outwardly, as indicated at 98, for mounting to a bottle with a compression fitting, not shown. Since the nipples of the present application are not hollow rubber shells, there is no need for an outwardly extending flange to mount them to the fluid container, as previously shown. The shape of the nipple and the means of attachment of the nipple to a fluid container are not central to this application.

The reticulated porous core 92 can be a foam, a sintered polymer or a sintered metal, so long as it provides an interconnected pore network in place of the capillaries produced by the previously described methods. This interconnected pore network is formed from the interconnected cells or voids in the porous materials. For fluid delivery, the reticulated porous material needs to be non-toxic and hydrophilic or the surface of the pore network needs to be coated with a non-toxic, water-insoluble hydrophilic coating. An example of a hydrophilic foam is the polyurethane foam described by Wood, U.S. Pat. Nos. 3,903,232 and 4,137,200, while an example of a sintered metal is stainless steel, and that of a hydrophilic sintered polymer is polyurethane. Of course, a hydrophobic foam or porous sintered material coated with a hydrophilic material could also be employed for fluid delivery.

Since only a portion of the nipple, usually the central axial portion of the nipple, and not the whole nipple should allow milk or water-based fluid to pass through, it is not possible to have a nipple made entirely of a reticulated porous material. Thus, in nipples using a porous material as the microscopic pathways for capillary action, the nipple 90 would consist of a porous core 92 surrounded by the nipple body made of elastic material, which must not permit the flow of liquid.

To manufacture a porous core nipple 90, the porous core 92, has to be formed into the proper shape. This would involve the use of one or more techniques, such as, molding, machining, or extrusion. The porous core could be made net-shape or its dimensions could be decreased to final dimensions. Once the porous core is in the proper shape for the nipple, the flexible nipple body, which must not be able to pass fluid, is formed or placed around the porous core 92. The flexible material for the nipple body can be formed or placed around the core in a number of ways. For example, the flexible nipple body material can be molded into the proper external shape and then machined if necessary so that there is a hollow central region to accept the porous core. Alternatively, the nipple could be formed to net shape with a hollow core. The porous core is then placed in the nipple body and sealed and/or bonded to the nipple body by friction, heat, an adhesive, or sealant that does not wet the porous material. Alternatively, the porous core can be placed in a suitable mold, after which a suitable nipple body material is injected, then cured or otherwise solidified to provide a nipple.

One additional method of making a porous-core nipple using reticulated foam is to form the porous core within a previously fabricated nipple body 90. That is, the nipple body is formed to net shape or near-net shape with a hollow central portion down the axis in the middle of the nipple. The surface of the hollow central portion in the nipple body can be made tapered or irregular for mechanical interlocking. The non-toxic hydrophilic foamed core is then formed completely filling the core in the nipple body using appropriate foam-forming techniques. The foam is then trimmed if necessary.

Regardless of how the foam core is formed, if the foam is not rigid, there is the possibility that it can be collapsed by an infant biting on the tip of the nipple. To prevent this, a thin rigid structural support 93 can be placed around the foamed core 92 in the nipple tip 94 along the entire length of the foam core. This thin rigid structural support can be placed around the foam before it is inserted into the nipple body or can be placed in the hollow core channel in the nipple body before the foam core is inserted or formed there. Alternatively, the nipple body can be formed around the structural support 93, and the foam core thereafter inserted or formed therein.

In order to prevent clogging of the relatively long fluid-delivery capillaries in the baby bottle nipple, it is possible to use fluid-delivery capillaries of desired cross-sectional shape or variable axial shape. In addition, for nipples utilizing either capillaries or reticulated porous material for fluid delivery, it is also possible to place a pre-filter between the container's contents and the nipple. This type of pre-filter is especially necessary for the nipple with tapered fluid-delivery capillaries such as seen in FIG. 3. Without the pre-filter, the tapered fluid-delivery capillaries can be clogged by any particles that enter the end of the capillary with the larger cross-sectional area, and are larger than the minimum capillary dimension. As noted previously, the minimum cross-sectional dimension of the pores or capillaries in the filter must be smaller than those that deliver milk or other water-based fluid to the infant so that they can effectively keep particulates that would clog the fluid-delivery pores or capillaries from entering the nipple. It is preferred that the minimum cross-sectional dimension of the pores or capillaries in the filter be significantly smaller that those that deliver milk or other water-based fluid to the infant, i.e., about 25% to 75% smaller than the fluid delivery pores or capillaries.

Figures 18, 19:
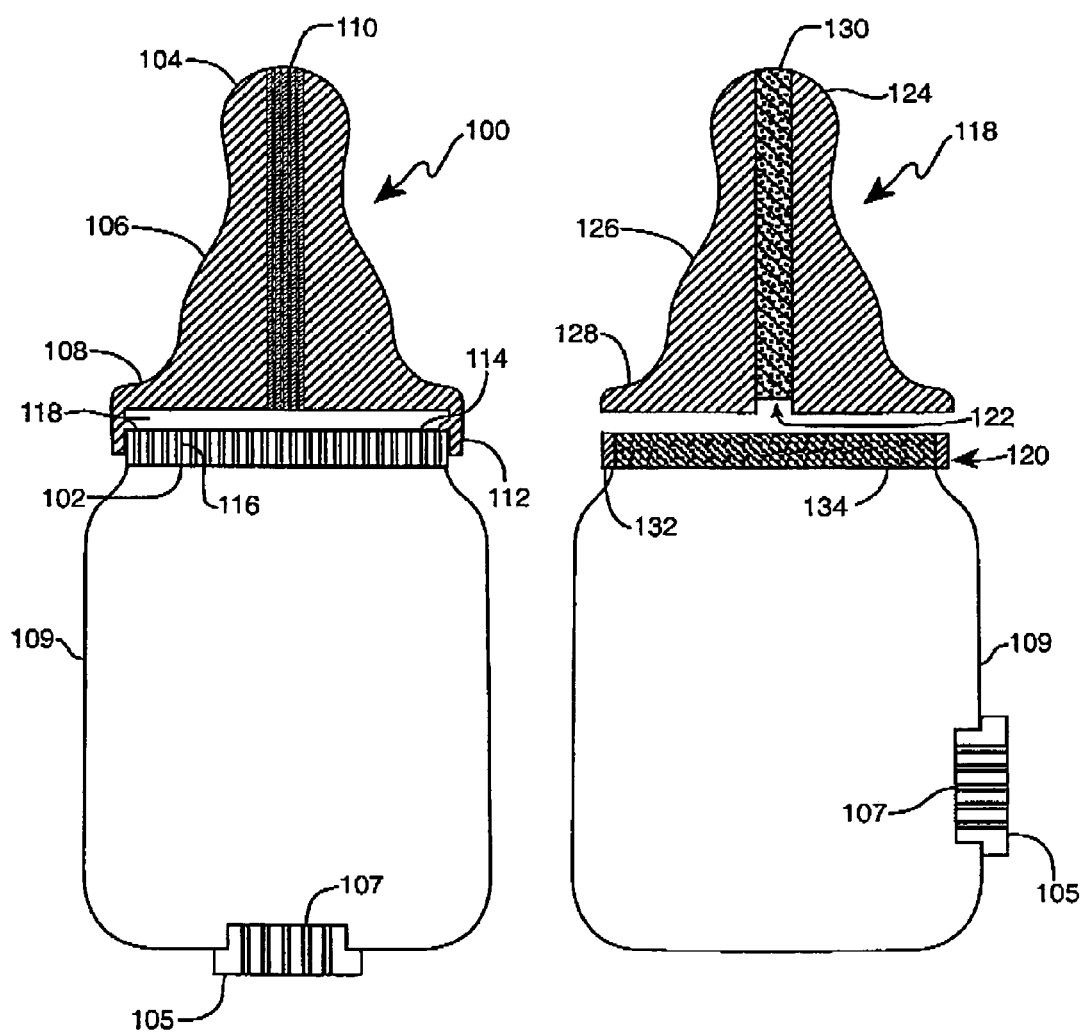
FIG. 18 is a cross-section through the center of a nipple having a plurality of fluid-delivery passages and an integral filter; which are attached to a bottle having a vent plug for air-admittance in the bottom of the bottle.
FIG. 19 is a cross-section through the center of a nipple having a reticulated porous core and a separate filter; which are attached to a bottle having a vent plug for air-admittance in the side of the bottle.
Figure 23:
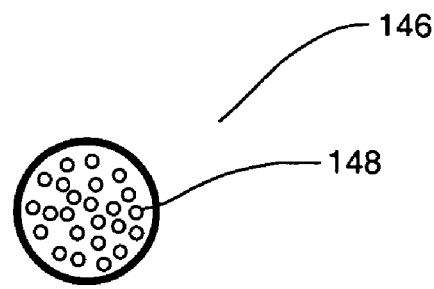
FIG. 23 is a cross-section illustrating a plurality of pultruded coated fibers.
Figure 24:
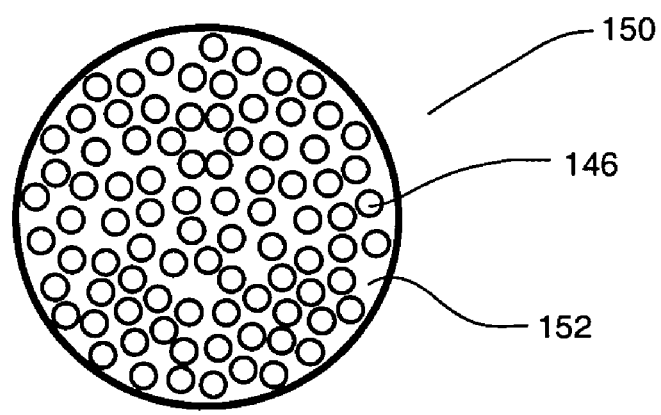
FIG. 24 is a cross-section illustrating a filter assembly comprising a plurality of the assemblies shown in FIG. 23.

FIG. 18 illustrates a nipple 100 with an integral filter 102. Nipple 100, like nipple 90 shown in FIG. 17, has a rounded tip 104 at its top end. Tip 104, which is shown as rounded, but can be flat or have any shape. Below the rounded tip 104, the nipple 100 flares outward to form a torso 106. Below torso 106, the nipple flares outwardly, as indicated at 108, for mounting to a closed container 109 with a compression fitting. Nipple 100 is shown as having a separately fabricated capillary bundle core 110, as discussed previously with regard to FIG. 4, although the invention is not limited thereto. Filter 102 comprises a plurality of bundles of capillaries or pores 116, such as those seen in FIG. 23.

Below the flare 108, nipple 100 extends downwardly to form a skirt 112, which includes an inwardly directed shoulder 114 for holding filter 102 apart from the fluid delivery passage 110, thereby providing a reservoir 118. Reservoir 118 is necessary because the position of the pores or capillaries in the filter and the nipple may not match. If the ends do not properly align, the pores or capillaries in the filter will not be able to feed the fluid-delivery capillaries in the nipple. The nipple 100 and filter 102 can be mounted to a bottle 109 using a compression fitting (not shown), as discussed previously. FIG. 18 also exhibits a vent plug 105 containing the air-admittance capillaries 107 in the bottom of the container. In this figure, the plug and capillaries have been enlarged for clarity.

In contrast to the integral filter 102, the filter can also be unattached, as shown in FIG. 19, which illustrates a nipple 118 and a filter 120. The nipple 118 and filter 120 can be mounted to a closed container 109 using a compression fitting (not shown), as discussed previously. One requirement for this separate, unattached filter is that the filter or the nipple provide a small clearance or reservoir, as at 122, between the filter and the fluid delivery pores or capillaries of the nipple.

Nipple 118, like nipple 90 shown in FIG. 17, has a rounded tip 124 at its top end. Tip 124, which is shown as rounded, but can be flat or have any shape. Below the rounded tip 124, the nipple 118 flares outward to form a torso 126. Below torso 126, the nipple flares outwardly, as indicated at 128, for mounting to a bottle with a compression fitting, not shown. Nipple 118 is shown as having a reticulated porous core 130, as discussed previously with regard to FIG. 17, although the invention is not limited thereto. Filter 120 comprises an optional structural ring 132 filled with a reticulated porous material 134.

FIG. 19 also shows a vent plug 105 containing the air-admittance capillaries 107 in the side of the container. In this figure, the plug and capillaries have been enlarged for clarity.

As stated previously, one of the major problems with current baby feeding systems is that a vacuum can be formed in the fluid container as a result of the infant's sucking. As the baby sucks harder to overcome the vacuum, he/she can swallow air, sometimes with very negative results. To alleviate this problem it is necessary that the pressure inside the bottle be continually equalized with the external pressure by admitting air into the baby bottle delivery system at a rate that is substantially equal to the rate at which the liquid is being withdrawn. This present application addresses this problem in a very unique manner, by employing hydrophobic microscopic pores or capillaries either in the nipple or elsewhere in the fluid delivery system such as the container or the mounting hardware to admit air. Only hydrophobic pores or air-admittance capillaries in the nipple will be discussed herein, although it should be noted that a portion of or all of the fluid container or mounting hardware can contain or be made of a material possessing hydrophobic pores or capillaries. It should be noted that the use of these air-admittance components is not limited to nipples with fluid-delivery capillaries; they can become components of any nipple or baby bottle delivery system currently on the market. These air-admittance components can also be incorporated into any part of a closed container normally used for dispensing a water-based fluid, such as toddler drinking cups, sports drinking bottles, and the like. FIG. 18 shows a vent plug 105 containing the air-admittance capillaries 107 in the bottom of the container, while in FIG. 19 the vent plug 105 containing the air-admittance capillaries 107 is in the side of the container. In both these figures, the plug and capillaries have been enlarged for clarity. Because the walls of these pores or capillaries are not wet by water, i.e., water forms a contact angle of greater than 90 degrees with the surface, these pores or capillaries will allow entrance of air into the fluid container to counteract the vacuum but will not allow the egress of fluid, if the pores or capillaries are properly sized and positioned. This will solve two problems associated with the prior art. Not only will weeping through the vent holes be avoided, but there will not be a problem of cleaning and sterilizing these air-admittance pores or capillaries since fluid will not enter them. These hydrophobic air-admittance capillaries or pores can be located anywhere in the nipple that is not in the infants mouth while sucking. The hydrophobic air-admittance component(s) can take any external shape, such as, a plug, core or disc and can be fabricated by the same techniques employed for the fluid-delivery passages. The air-admittance passages can also take the form of microscopic holes or pores that pass through a nipple body made of a hydrophobic material. Alternatively, any hydrophobic microporous reticulated material can be inserted and sealed in the nipple body.

It should be noted that there are some differences between an air admittance device utilizing capillaries and a device utilizing microporous material as the pressure equalizing pathway. These differences point out the superiority of utilizing capillaries over a microporous material for air admittance.

A microporous material cannot guarantee an exact pore size, but rather provides a distribution of pore sizes around some average value. This distribution of pore sizes does not allow for a precise threshold pressure for liquid breakthrough on the basis of a precise pore dimension as is the case with capillaries of precisely controlled uniform cross-sectional dimension. Also, the straight concave walls of an essentially 2-dimensional capillary entrance offer much greater resistance to liquid entrance than the 3-dimensional convex curved ligands or particle surfaces present in a microporous material.

Although a capillary air admittance device is superior to a microporous air admittance device, there are also differences in effectiveness among microporous devices. The effectiveness of a microporous air admittance device depends on the percentage of the pores that are open and go through the entire device. That is, the size and number of pores per unit volume is not relevant if the pores are closed or do not connect with a network that goes through the device. Thus, it is important that the microporous material be highly reticulated. With a high quality reticulated material, an air admittance device can be made with a very small cross-sectional area (<0.5 cm$^2$ and preferably less than 0.2 cm$^2$) and still be very effective in eliminating a partial vacuum in a closed container. The use of a highly reticulated material greatly decreases the amount of material needed and the size of the device which significantly decreases the cost.

Figure 20:
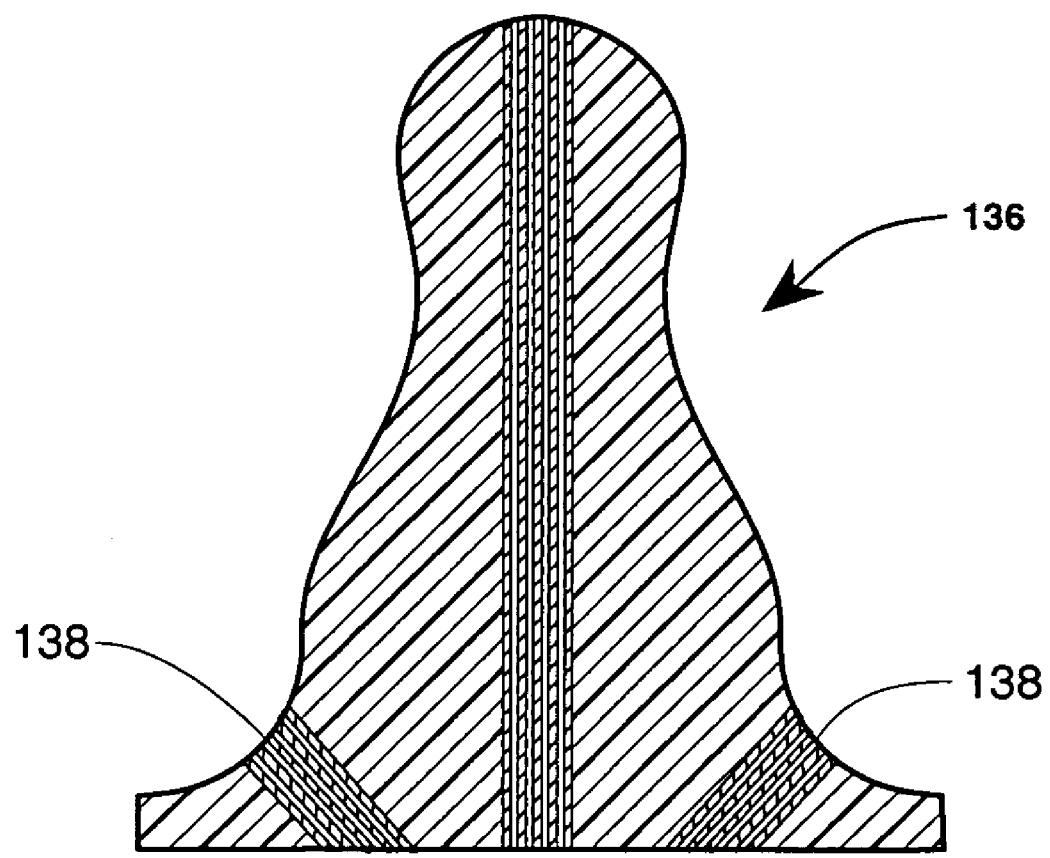
FIG. 20 is a cross-section through the center of a nipple having a plurality of fluid-delivery passages and air-admittance capillaries.

FIG. 20 illustrates a nipple 136, otherwise configured as disclosed previously, also comprising at least one hydrophobic air-admittance means or device 138. These air-admittance means 138 can be air-admittance capillaries or air-admittance reticulated porous material, and are similar in configuration to the fluid-delivery passages disclosed hereinbefore, with the exception that they are hydrophobic. The air-admittance capillaries or reticulated porous materials can be in multiple locations throughout the nipple, such as at 180-degrees apart, two such air-admittance means being shown in this figure. An example of a hydrophobic foam is the polyurethane foam described by Kehr et al, U.S. Pat. No. 3,959,191.

Nipple 136 can be fabricated in a manner similar to fabrication of the nipple shown in FIG. 4. That is, a separately fabricated fluid-delivery capillary bundle core and a separately fabricated air-admittance capillary bundle core are placed in a mold having the final shape of the nipple. The mold is then filled with elastomeric nipple body material or a nipple body precursor material and solidified producing a net-shaped nipple. The fugitive material is then removed, as previously described.

Alternatively, nipple 136 can be fabricated by other means. For example, the fluid-delivery capillary bundle core, the air-admittance component(s), and the nipple body can all be fabricated separately. In this case the molded nipple body contains a void for the capillary bundle core, such as the hollow central portion 48 in FIG. 7, and one or more shaped voids for the pre-fabricated air-admittance component(s), which can be in the form of an air-admittance capillary bundle core, a porous reticulated core, or a thin porous membrane. The fluid-delivery capillary bundle core and the air-admittance component(s) can be held in place by the various methods previously described. Although the air-admittance devices are, in this embodiment, incorporated into the nipple of a baby feeding bottle, such devices can be positioned anywhere in the container or lid. Such device can be fabricated as an integral part of the container, such as capillaries formed directly in the container wall or molding the container around the device.

Alternatively, the device can be permanently placed in a pre-formed void in the container or lid after manufacture by, for example, the use of an adhesive, grommet, or foaming technique. Additionally, the device can be attached to the container or lid with a temporary means, such as with a screw thread or snap so that it can be removed to enhance cleaning of the container.

It is within the scope of this invention to provide a nipple wherein the nipple body that is not in the child's mouth can function as a path for air-admittance. Referring again to FIG. 4, a separately fabricated nipple core 40 is placed in a suitable mold. Sufficient body material which will form a hydrophobic reticulated foam is then injected into the mold to fill the mold. After solidifying the nipple body material, by appropriate technique, the nipple is removed from the mold and sufficient solidified nipple body material is removed from the tip end and from the flange end to expose the end(s) of the fugitive fiber(s). The fugitive fiber(s) is(are) removed as described previously, thereby leaving fluid-delivery passages with interior dimensions equal to or less than the external dimensions of the fugitive material. Since the reticulated foam body material has no mechanical strength, it offers little resistance to the biting of an infant. Therefore, either the core material must be rigid or it must be surrounded on its exterior with a rigid material.

The minimum dimension of the hydrophobic pores or capillaries for air-admittance will depend on the hydrophobic material that is on the interior pore or capillary wall and the contact angle that the water-based fluid makes with it. In general, the minimum cross-sectional dimension of the air-admittance pore or capillary will be such that a differential pressure of at least 1 psia will be required to force the water-based fluid through it. These air-admittance hydrophobic pores, i.e., reticulated porous material, or capillaries, should have a cross-sectional dimension of about 0.1 to 200 microns, preferably about 1 to 50 microns. It is presently preferred that such capillaries have a constant axial diameter. In contrast to prior art nipples, in which there is a vent hole in the nipple, the air-admittance pathways of the present invention do not leak because they are smaller. That is, instead of using a large hole for air-admittance that will leak because it is sized for an adequate rate of air-admittance to equalize the vacuum caused by liquid removal, the capillaries or pores of the present invention are much smaller and more numerous to allow for an adequate rate of air-admittance while at the same time preventing liquid egress because of the smaller diameter and the hydrophobic inner surface. In contrast to the fluid-delivery capillaries, which must have a significant length to traverse the solid axial portion of the nipple, the air-admittance pores or capillaries can be in the form of a thin membrane if the contact angle is high enough and the pore size is small enough to prevent the ingress of fluid.

Figure 21:
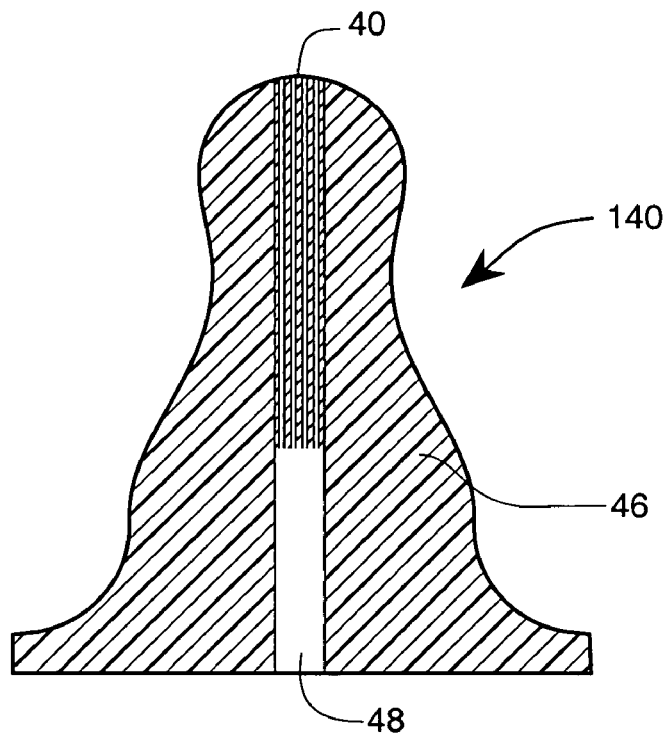
FIG. 21 is a cross-section through the center of a baby nipple with a separately fabricated core comprising a plurality of fluid-delivery passages.
Figure 22:
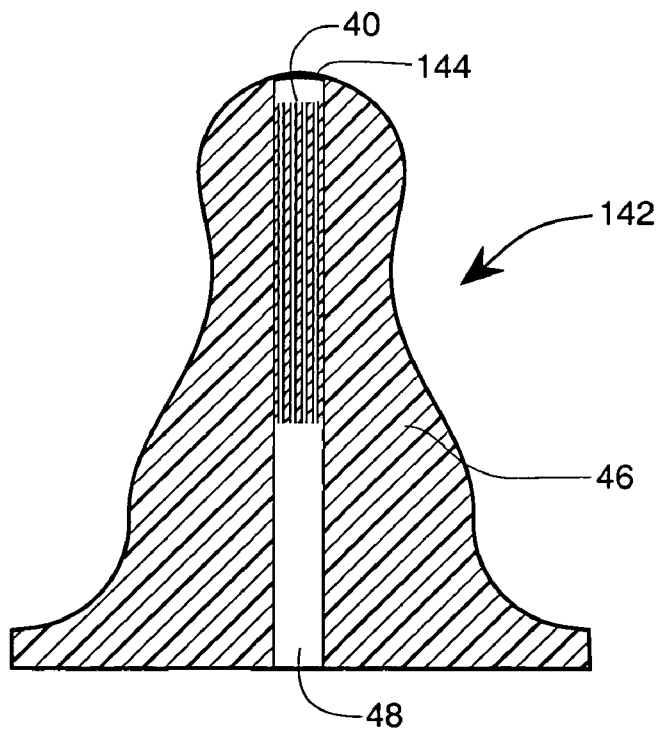
FIG. 22 is a cross-section through the center of a baby nipple with a separately fabricated core comprising a plurality of fluid-delivery passages.
Figure 26:
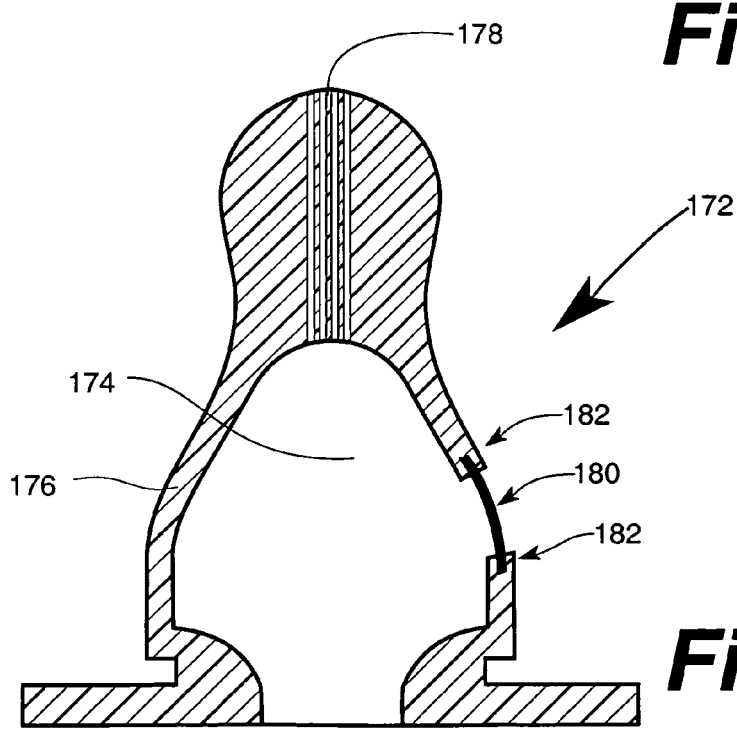
FIG. 26 is a cross-section through the center of a baby nipple with a separately fabricated core comprising a plurality of fluid-delivery passages and with a separately fabricated air-admittance membrane.

In all of the nipples made with a separately formed core, the length of the nipple core does not have to equal the length of the nipple body. For fluid delivery it is necessary that the fluid delivery capillaries be the same length as the nipple core. However, it is not necessary that the length of the core equal that of the body. Three examples are shown in FIGS. 21, 22 and 26 in which the core is shorter than the nipple. FIG. 21 illustrates a nipple 140 fabricated by inserting a short piece of capillary bundle core 40 (see FIG. 6) into a nipple body 46 having a hollow central portion 48 (see FIG. 7). The resulting construction keeps the tip that is in the infants mouth from closing off. In this design, the lower portion of the nipple is hollow and thus part of the fluid reservoir. This design is closer to the conventional nipple design and requires less material to manufacture than a nipple with a core length that equals the length of the nipple.

FIG. 22 illustrates a nipple 142 also fabricated by inserting a short piece of capillary bundle core 40 (see FIG. 6) into a nipple body 46 having a hollow central portion 48 (see FIG. 7). Nipple 142 has a short open space between the core 40 and the external tip 144. This space acts as a reservoir between the hydrophilic capillaries in core 40 and microscopic hydrophobic passages in the form of capillaries, pores, or holes in the tip 144. These hydrophobic passages in tip can be in the form of microscopic holes formed in a thin section of nipple body material in the tip or in the form of a thin hydrophobic membrane inserted in the tip. Such membrane can be supported mechanically using a rigid support structure such as a ring. The combination of the reservoir and the hydrophillic passages in the core work together to bring liquid to the tip while the hydrophobic passages in the tip prevent liquid from exiting the nipple unless there is a slight pressure differential.

FIG. 26 illustrates a nipple 172 that is similar to nipple 140 in FIG. 21 with the exception that the lower portion of the hollow central region of the nipple body has been enlarged to produce a hollow bulbous portion 174 of the nipple body similar to that of a conventional nipple seen in FIG. 1. This hollow bulbous portion of the nipple body is now part of the fluid reservoir. This design is even closer to the conventional nipple design and requires even less material to manufacture than the nipple 140 in FIG. 21. In contrast to the previous nipple designs in which the solid portion of the nipple extends the length of the nipple, in this nipple, the solid portion of the nipple body only extends the length of the shortened nipple core 178.

The thinner nipple body wall 176 in the lower portion of nipple 172 more easily allows the insertion of a self-supporting hydrophobic membrane or device 180 for air-admittance. This figure shows the membrane 180 held in the nipple wall 176 between two flaps 182. The membrane can be molded into the nipple body or it can be placed in the nipple body after the body has been manufactured. If it is placed in the body after manufacture, it can be placed (with or without a mechanical support ring) between flaps in the nipple wall as shown, or a mechanical support ring for the membrane in the form of a grommet, for example, can anchor the membrane to the wall of the nipple body. A seal (if required) between the membrane and the nipple body can be any of those described above.

The hydrophobic air-admittance capillaries can be fabricated by any of the methods described for the hydrophilic fluid delivery capillaries with the exception of the materials or surface treatments used. In addition to these methods described, the hydrophobic air-admittance capillaries can also be fabricated by classical extrusion techniques employing gas-injection or the co-extrusion of a sacrificial material. In the same way the hydrophobic reticulated air-admittance membranes or devices can be fabricated by the same methods used for the hydrophilic fluid delivery porous materials. They can also be fabricated utilizing microporous templates as well as sacrificial particles in connection with both foaming and sintering techniques.

Having thus described exemplary embodiments of the present invention, it should be noted by those skilled in the art that the disclosures herein are exemplary only and that alternatives, adaptations and modifications may be made within the scope of the present invention.

We claim:

1. A food or beverage container having a water-based fluid, a partial vacuum and a plurality of air-admittance capillaries, wherein each air-admittance capillary has a hydrophobic interior surface and at least one cross-sectional dimension in the range of 0.1 to 80 microns, wherein said air-admittance capillaries admit air into the container while preventing passage of a water-based fluid therethrough.

2. The container of claim 1 wherein said air-admittance capillary has a constant axial diameter.

3. The container of claim 1 wherein said air-admittance capillary is rectangular.

4. The container of claim 1 wherein said air-admittance capillary has a cross-sectional dimension in the range of 1 to 50 microns.

* * * * *